(12) United States Patent
Lee et al.

(10) Patent No.: US 8,717,523 B2
(45) Date of Patent: May 6, 2014

(54) ARRAY SUBSTRATE FOR LIQUID CRYSTAL DISPLAY DEVICE AND LIQUID CRYSTAL DISPLAY DEVICE INCLUDING THE SAME

(75) Inventors: Hwi-Deuk Lee, Gyeongsangbuk-do (KR); Dong-Seok Park, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 414 days.

(21) Appl. No.: 13/166,548

(22) Filed: Jun. 22, 2011

(65) Prior Publication Data
US 2012/0127412 A1    May 24, 2012

(30) Foreign Application Priority Data

Nov. 20, 2010  (KR) .......................... 10-2010-0115912

(51) Int. Cl.
*G02F 1/1343*    (2006.01)
(52) U.S. Cl.
USPC ............................................. 349/139; 349/39

(58) Field of Classification Search
None
See application file for complete search history.

(56) References Cited

U.S. PATENT DOCUMENTS

2004/0001176 A1*   1/2004   Kim et al. ..................... 349/139
2009/0015778 A1*   1/2009   Cho et al. ..................... 349/152

* cited by examiner

*Primary Examiner* — Lucy Chien
(74) *Attorney, Agent, or Firm* — Birch, Stewart, Kolasch & Birch, LLP

(57) ABSTRACT

An array substrate for a liquid crystal display device including a substrate having a display region and a non-display region at one side of the display region; gate lines along a first direction and in the display region; data lines along a second direction and in the display region, the data lines crossing the gate lines to define pixel regions; auxiliary gate lines along the second direction and in the display region, the auxiliary gate lines respectively connected to the gate lines; data pad electrodes in the non-display region and electrically connected to the data lines, respectively; and gate pad electrodes in the non-display region and electrically connected to the auxiliary gate lines, respectively.

27 Claims, 6 Drawing Sheets

ARRAY SUBSTRATE FOR LIQUID CRYSTAL DISPLAY DEVICE AND LIQUID CRYSTAL DISPLAY DEVICE INCLUDING THE SAME

The present application claims the benefit of Korean Patent Application No. 10-2010-0115912 filed in Korea on Nov. 20, 2010, which is hereby incorporated by reference.

BACKGROUND OF THE INVENTION

1. Field of the Invention

The present invention relates to a liquid crystal display (LCD) device, and more particularly, to an array substrate for a liquid crystal display device having a narrow bezel and a liquid crystal display device including the same.

2. Discussion of the Related Art

In general, the LCD device uses optical anisotropy and polarization properties of liquid crystal molecules to produce an image. In more detail, due to the optical anisotropy of the liquid crystal molecules, the refraction of light incident onto the liquid crystal molecules depends upon the alignment direction of the liquid crystal molecules. Further, the liquid crystal molecules have long thin shapes that can be aligned along specific directions. The alignment direction of the liquid crystal molecules can also be controlled by applying an electric field. Accordingly, the alignment of the liquid crystal molecules changes in accordance with the direction of the applied electric field, and the light is refracted along the alignment direction of the liquid crystal molecules due to the optical anisotropy, thereby images can be displayed.

In addition, the LCD device includes an upper substrate having a common electrode, a lower substrate having a pixel electrode, and a liquid crystal layer interposed therebetween. Liquid crystal molecules are also driven by an electric field generated between the common and pixel electrodes.

In more detail, FIG. 1 is a schematic plane view of a related art LCD device. Referring to FIG. 1, the LCD device 1 includes a first substrate 10, a second substrate 20, and a liquid crystal layer interposed therebetween. Also, a gate line, a data line, a pixel electrode and a thin film transistor (TFT) are formed on the first substrate 10, and a common electrode and a color filter layer are formed on the second substrate 20.

The first substrate 10 also has a larger size than the second substrate 20 such that adjacent two sides of the first substrate 10 may be exposed. As shown in FIG. 1, the adjacent two sides are respectively defined as first and second non-display regions "NA1" and "NA2". The other region is defined as a display region "DA".

A plurality of gate pad electrodes and a plurality of data pad electrodes, which are connected to an external circuit, are also respectively formed in the first and second non-display regions "NA1" and "NA2". In addition, a plurality of gate link lines and a plurality of data link lines, which are respectively connected to the gate pad electrodes and the data pad electrodes, are formed in the first and second non-display regions "NA1" and "NA2".

A plurality of gate lines connected to the gate pad electrodes via the gate link lines, and a plurality of data lines connected to the data pad electrodes via the data link lines are also formed in the display region "DA". The gate and data lines also cross each other to define pixel regions. In addition, a TFT is formed at a crossing portion of the gate and data lines, and a pixel electrode connected to the TFT is formed in each pixel region.

The second substrate 20 also faces the first substrate 10, and a color filter layer including red, green and blue color filter patterns and the common electrode are formed on the second substrate 20. A black matrix may also be formed on the second substrate 20. For example, the black matrix shields the gate and data lines.

In addition, the liquid crystal layer is interposed between the first and second substrates 10 and 20, and a seal pattern is formed along edges of the first and second substrates 10 and 20. A backlight unit providing light is disposed under the first substrate 10, and a driving part for driving the LCD device is formed at edges of the first substrate 10. Generally, the driving part is installed on a driving circuit board 50.

Further, the driving circuit board 50 is installed on the first substrate 10 with a data driving flexible printed circuit board (FPCB) 62. The data driving FPCB 62 is electrically connected to the data pad electrodes disposed in the first non-display region "NA1". Also, a gate driving FPCB 61 is electrically connected to the gate pad electrodes disposed in the second non-display region "NA2" and attached to the second non-display region "NA2". The gate driving FPCB 61 is also electrically connected to the driving circuit board 50 such that another driving circuit board for the gate driving FPCB 61 is not required. Alternatively, a driving circuit board may be attached to the second non-display region "NA2". In addition, a tape carrier package (TCP) may be used instead of the FPCBs 61 and 62. A gate driving integrated circuit (IC) 71 and a data driving IC 72 are also respectively disposed in the gate driving FPCB 61 and the data driving FPCB 62.

In addition, the LCD device 1 is widely used for various electrical equipments such as a TV, a monitor, a note-book computer, a mobile phone, a PDA, and so on. However, there are some limitations on the display size of the LCD device.

SUMMARY OF THE INVENTION

Accordingly, one object of the present invention is to provide an array substrate for an LCD device and a corresponding LCD device that substantially obviate one or more of the problems due to limitations and disadvantages of the related art.

Another object of the present invention is to increase the display area of the LCD device.

To achieve these and other advantages and in accordance with the purpose of the present invention, as embodied and broadly described herein, the present invention provides in one aspect an array substrate for a liquid crystal display device including a substrate having a display region and a non-display region at one side of the display region; gate lines along a first direction and in the display region; data lines along a second direction and in the display region, the data lines crossing the gate lines to define pixel regions; auxiliary gate lines along the second direction and in the display region, the auxiliary gate lines respectively connected to the gate lines; data pad electrodes in the non-display region and electrically connected to the data lines, respectively; and gate pad electrodes in the non-display region and electrically connected to the auxiliary gate lines, respectively.

In another aspect, the present invention provides a liquid crystal display device including a substrate having a display region and a non-display region at one side of the display region; gate lines along a first direction and in the display region; data lines along a second direction and in the display region, the data lines crossing the gate lines to define pixel regions; auxiliary gate lines along the second direction and in the display region, the auxiliary gate lines respectively connected to the gate lines; data pad electrodes in the non-display region and electrically connected to the data lines, respectively; gate pad electrodes in the non-display region and electrically connected to the auxiliary gate lines, respectively; a second substrate facing the first substrate; and a liquid crystal layer between the first and second substrates.

In still another aspect, the present invention provides an array substrate for a liquid crystal display device including a plurality of display regions having first, second and third pixels, the first and second pixels being spaced from each other by a first distance and the third pixel being spaced from the second pixel by a second distance that is greater than the first distance; gate lines along a first direction of the array substrate; data lines along a second direction of the array substrate, the data lines crossing the gate lines and being between the first and second pixels; auxiliary gate lines along the second direction and being between the second and third pixels in the display region, the auxiliary gate lines respectively connected to the gate lines; and a non-display region including data pad electrodes electrically connected to the data lines and gate pad electrodes electrically connected to the auxiliary gate lines.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments, examples of which are illustrated in the accompanying drawings.

Figure 2:
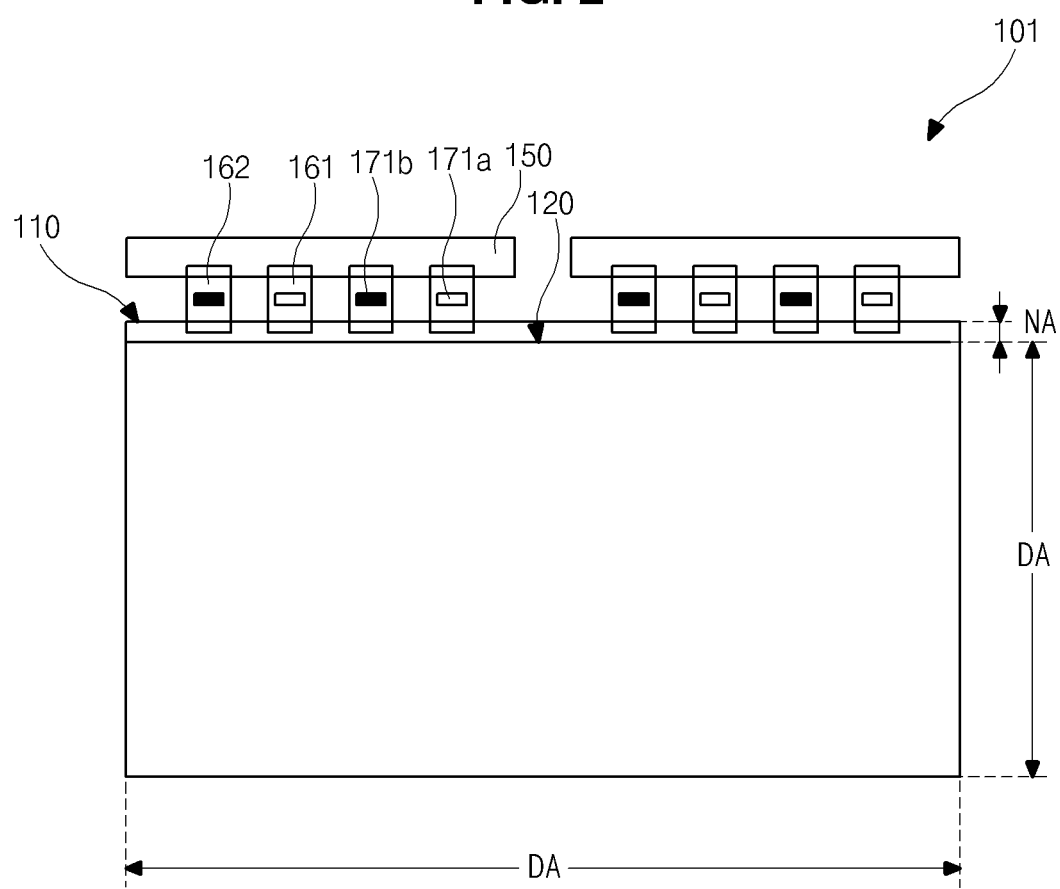
FIG. 2 is a schematic plane view of an LCD device according to an embodiment of the present invention.

FIG. 2 is a schematic plane view of an LCD device 101 according to an embodiment of the present invention. As shown in FIG. 2, the LCD device 101 includes a first substrate 110, a second substrate 120, and a liquid crystal layer interposed therebetween. The first substrate 110 also has a larger size than the second substrate 120 such that one side of the first substrate 110 is exposed. The one side is defined as a non-display regions "NA". The other region is defined as a display region "DA".

A driving circuit board 150 is also attached to the non-display region "NA" of the first substrate 110 with first and second FPCBs 161 and 162. In addition, a gate driving IC 171a and a data driving IC 171b are disposed at the first FPCB 161 and the second FPCB 162, respectively. Thus, because there is no driving IC at sides of the device, except the non-display region "NA", a size of a bezel of the LCD device 101 is decreased and a size for displaying an image is increased. Namely, the LCD device 101 according to an embodiment of the present invention has a narrow bezel.

Figure 3:
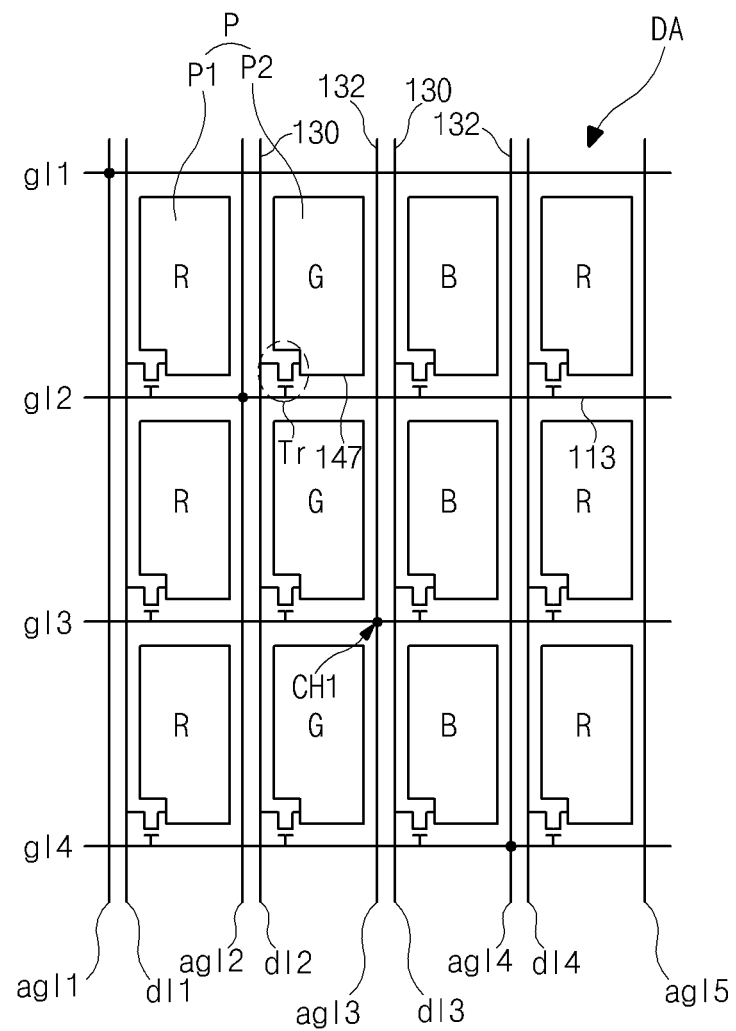
FIG. 3 is a schematic plane view of a portion of an array substrate for an LCD device according to a first embodiment of the present invention.
Figure 4:
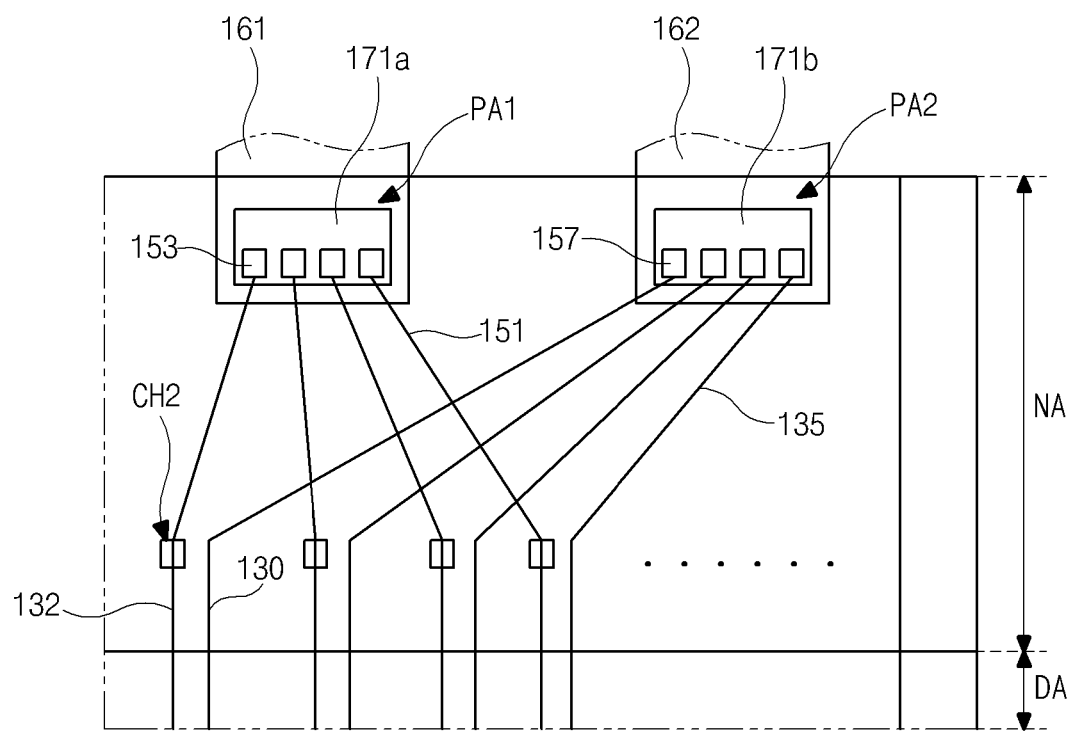
FIG. 4 is an enlarged plane view showing a non-display region of an array substrate for an LCD device according to the first embodiment of the present invention.

Next, FIG. 3 is a schematic plane view of a portion of an array substrate, and FIG. 4 is an enlarged plane view showing a non-display region of the array substrate for an LCD device according to the first embodiment of the present invention. Referring to FIGS. 2-4, the first FPCB 161 is electrically connected to auxiliary gate lines 132, and the second FPCB 162 is electrically connected to data lines 130. The auxiliary gate lines 132 are also parallel to the data lines 130 and alternately arranged with the data lines 130. Further, one auxiliary gate line 132 has a first distance from an adjacent data line 130 and a second distance from another adjacent data line 130. Further, the second distance is greater than the first distance. In other words, in FIG. 3, one auxiliary gate line 132 has the first distance from a right side data line 130 and the second distance from a left side data line 130.

In addition, as shown in FIG. 3, gate lines 113 are formed along a first direction in the display region "DA" of the first substrate 110. In more detail, the gate lines 113 cross the data lines 130 and the auxiliary gate lines 132. Thus, first and second pixel regions "P1" and "P2" are defined by crossing the gate lines 113 and the data lines 130.

When two adjacent auxiliary gate lines 132 and data lines 130 are referred to as a line pair, each of the first and second pixel regions "P1" and "P2" is positioned between adjacent two line pairs and there is no pixel region between the auxiliary gate line 132 and the data line 130 in one line pair. Also, a common electrode can be formed at the same layer and of the same material as the gate line 113 between adjacent gate lines 113. The auxiliary gate lines 132 are also between adjacent pixel regions (e.g., between pixel regions "P1" and "P2").

Further, the plurality of data lines 130 are formed along a second direction and over the gate lines 113 with a gate insulating layer therebetween. Also, the data line 130 and the auxiliary gate line 132 are disposed between the first and second pixel regions "P1" and "P2". A TFT "Tr" in the first pixel region "P1" is connected one gate line 113 and one data line 132, and the TFT "Tr" in the second pixel region "P2" is connected to one gate line 113 and another one data line 132.

In addition, the auxiliary gate lines 132 are formed along the second direction on the first substrate 110. Namely, the auxiliary gate line 132 is parallel to the data line 130 and crosses the first and second gate line 113. The auxiliary gate lines 132 are also alternately arranged with the data lines 130. Further, the auxiliary gate line 132 is formed of the same material and on the same layer as the data line 130.

In addition, the auxiliary gate line 132 is connected to one of the gate lines 113 through a first contact hole "CH1" in the gate insulating layer (see FIG. 3). One auxiliary gate line is connected to one gate line, and another auxiliary gate line is connected to another gate line. For example, as shown in FIG. 3, when the reference numbers "gl1", "gl2", "gl3", and "gl4"... are marked to the gate lines 113 in order and the reference numbers "dl1", "dl2", "dl3", "dl4" ... "agl1", "ag12", "ag13", and "gl4" ... are marked to the data lines 130 and the auxiliary gate lines 132 in order, the auxiliary gate lines "agl1", "agl2", "agl3", and "gl4" are respectively connected to the gate lines "gl1", "gl2", "gl3", and "gl4."

In addition, the LCD device generally has a horizontal length greater than a vertical length. For example, a wide TV has a resolution of 1080*720, that is, 1080 dots in a horizontal direction and 720 dots in a vertical direction are arranged in a matrix shape. Because each dot includes three pixel regions along the horizontal direction, the number of the data lines 130 is 1080*3 and the number of the gate lines 113 is 720. The three pixel regions of each dot respectively have red, green and blue color filter patterns for producing full color images.

In the above LCD device, when the LCD device has a display region "DA" for a resolution of 1080*720, the data lines 130 of 1080*3 and the gate lines of 720 are used. Also, because the number of the auxiliary gate lines 132 is same as that of the data lines 130, the number of the auxiliary gate lines 132 is larger than that of the gate lines 113. Accordingly, all gate lines 113 are electrically connected to the auxiliary gate lines 132 in a one-to-one correspondence.

Further, a gate signal voltage is applied to the gate line 113 through the auxiliary gate lines 132. Because the auxiliary gate line 132 is parallel to the data line 130, an end of the auxiliary gate line 132 and an end of the data line 130 are positioned in the non-display region "NA". A data pad electrode 157 and a gate pad electrode 153 are also formed in the non-display region "NA". The data pad electrode 157 and the gate pad electrode 153 are respectively positioned in the data driving IC 171b and the gate driving IC 171a.

In addition, the data pad electrode 157 is electrically connected to the data line 130 via a data link line 135, and the gate pad electrode 153 is electrically connected to the auxiliary gate line 132 via a gate link line 151. The data link line 135 is formed at the same layer as the data line 130. Namely, the data link line 135 extends from the data line 130. Further, the gate link line 151 is preferably formed at a different layer from the auxiliary gate line 132 to avoid an electrical short with the data link line 135. The gate link line 152 is also connected to the auxiliary gate line 132 through a second contact hole "CH2" (see FIG. 4).

Figure 1:
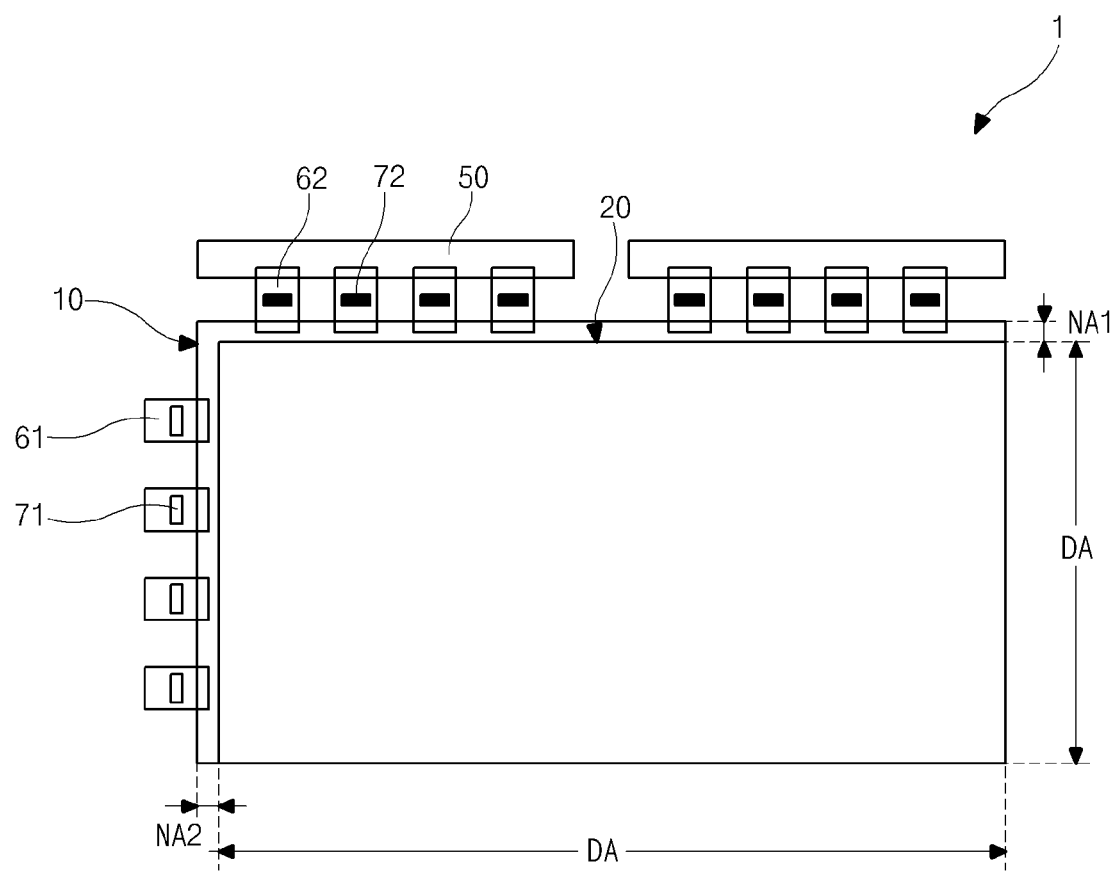
FIG. 1 is a schematic plane view of the related art LCD device.

Accordingly, the driving circuit board 150 (see FIG. 2) is positioned at one side of the first substrate 110, i.e., the non-display region "NA". There is no gate driving IC and gate driving circuit board at other sides of the first substrate, e.g., the second non-display region "NA2" of FIG. 1. Thus, a bezel of the LCD device can be narrowed. That is, as shown in FIG. 2, there is only one non-display region "NA" at one side. Alternatively, there may be another non-display region at other sides.

In the embodiments of the present invention, because a space for a driving IC, a driving circuit board, or electrical lines for applying a signal voltage to the gate lines is not used in another non-display region except the one non-display region "NA", a width of the other non-display region is smaller than the display region "NA". Accordingly, a bezel of the LCD device is narrowed.

Further, FIG. 4 shows the data link line 135 on the same layer as the data line 130 and the gate link line 151 on a different layer from the auxiliary gate line 132. Alternatively, the data link line 135 may be formed at a different layer from the data line 130, while the gate link line 151 may be formed at the same layer as the auxiliary gate line 132. In this instance, the data link line 135 is connected to the data line 130 through a contact hole.

In addition, a TFT "Tr", which is connected to one of the gate lines 113 and one of the data lines 130, is disposed in each of the first and second pixel regions "P1" and "P2". For example, the TFT "Tr" may include a gate electrode connected to the gate line 113, a gate insulating layer, a semiconductor layer including an active layer of intrinsic amorphous silicon and an ohmic contact layer of impurity-doped amorphous silicon, a source electrode connected to the data line 130, and a drain electrode.

As shown in FIG. 3, a pixel electrode 147 connected to the TFT "Tr" is disposed in each of the first and second pixel regions "P1" and "P2". When the common line is formed, the pixel electrode 147 overlaps the common line to form a storage capacitor. Alternatively, when the common line is not formed, the pixel electrode 147 overlaps one of the first and second gate lines 113 to form a storage capacitor.

Further, in FIG. 3, the pixel electrode 147 has a plate shape in each of the first and second pixel regions "P1" and "P2" on the first substrate 110, and the common electrode is formed on the second substrate 120. Alternatively, a plurality of pixel electrodes and a plurality of common electrodes, each of which has a bar shape, are alternately arranged with each other on the first substrate 110.

Thus, in the above LCD device, because the driving ICs 171a and 171b, the FPCBs 161 and 162 and the driving circuit board 150 are positioned at one side of the first substrate 110, i.e., the non-display region "NA", the LCD device 101 has a narrow bezel. In addition, because a black matrix on the second substrate 120 can shield the auxiliary gate line 132, an aperture ratio can be decreased.

Figure 5:
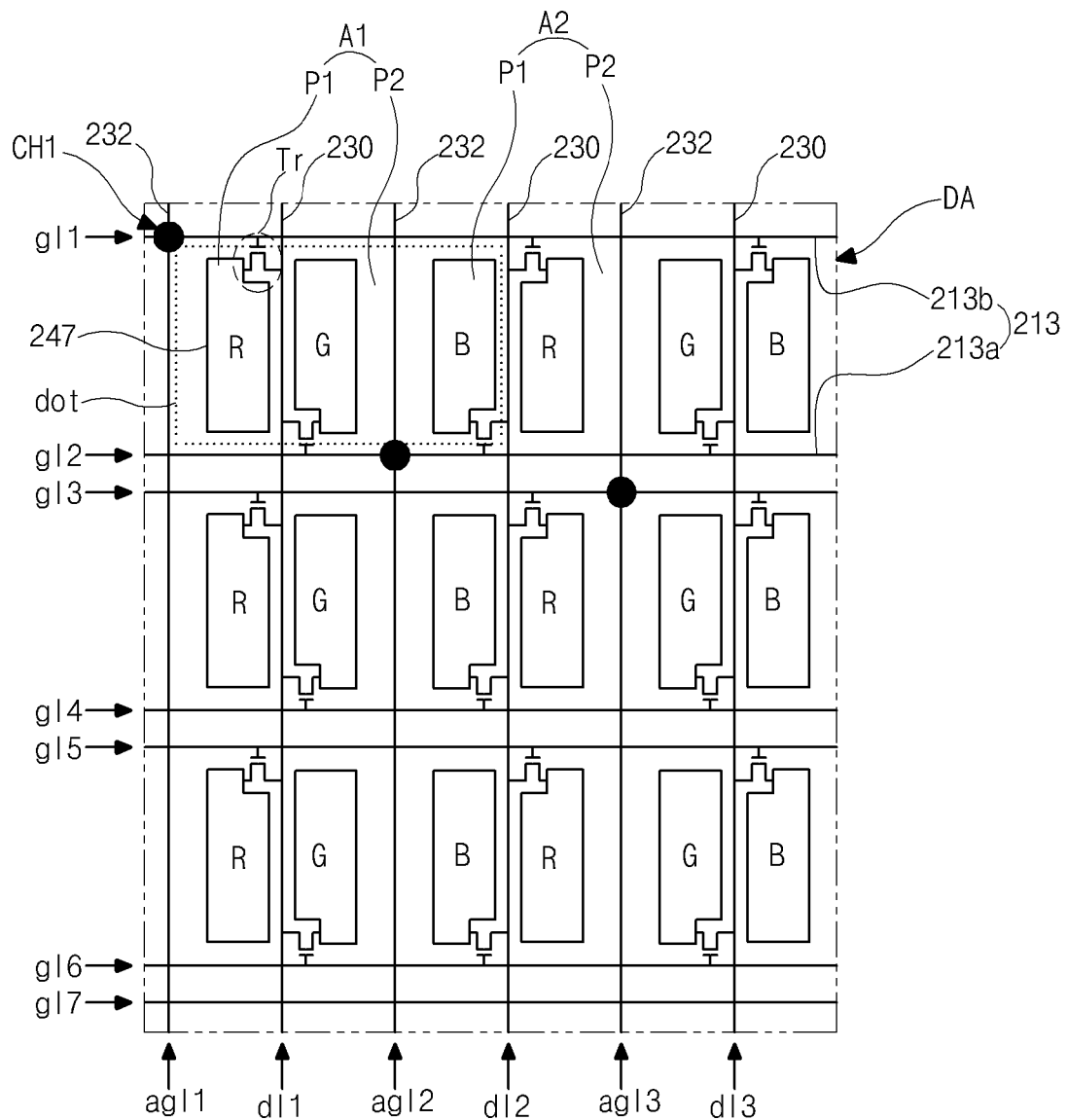
FIG. 5 is a schematic plane view of a portion of an array substrate for an LCD device according to a second embodiment of the present invention.
Figure 6:
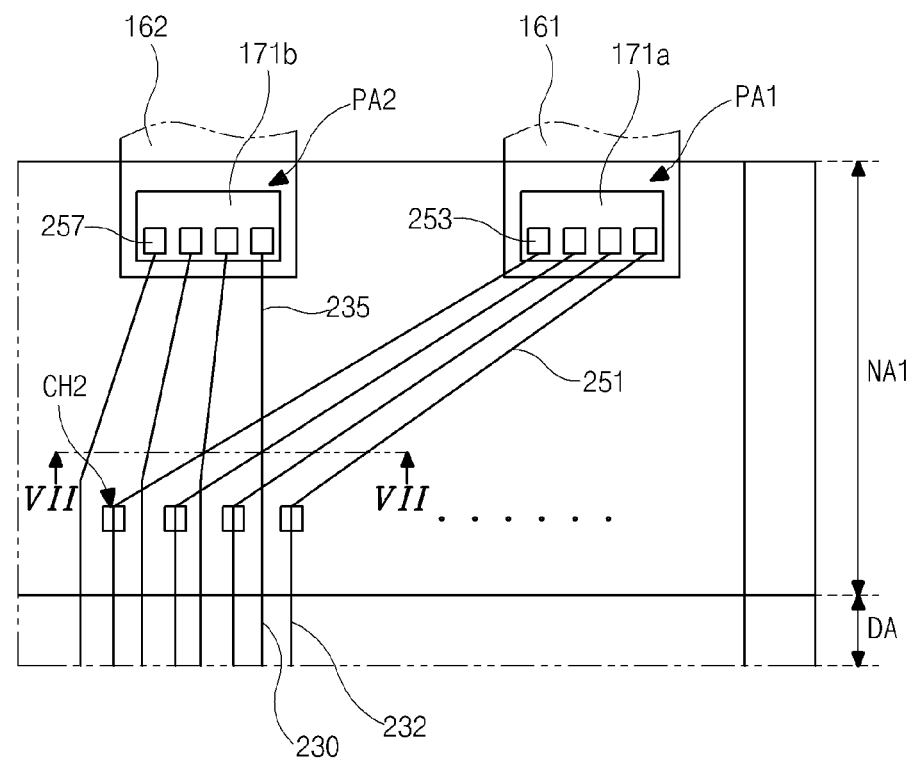
FIG. 6 is an enlarged plane view showing a non-display region of an array substrate for an LCD device according to the second embodiment of the present invention.

Next, FIG. 5 is a schematic plane view of a portion of an array substrate for an LCD device, and FIG. 6 is an enlarged plane view showing a non-display region of an array substrate for an LCD device according to the second embodiment of the present invention. Referring to FIGS. 2, 5 and 6, the first FPCB 161 is electrically connected to auxiliary gate lines 232, and the second FPCB 162 is electrically connected to data lines 230. The auxiliary gate lines 232 are also parallel to the data lines 230. Further, because the auxiliary gate line 232 and the data line 230 are not closely positioned, a signal interference is significantly reduced.

Further, as shown in FIG. 5, first and second gate lines 213a and 213b are formed along a first direction in the display region "DA" of the first substrate 110. The first and second gate lines 213a and 213b are also parallel to each other with a first distance. In addition, a gate line pair 213 of the first and second gate lines 213a and 213b is repeatedly formed. As shown in FIG. 5, the first gate line 213a has a second distance, which is smaller than the first distance, with the second gate line 213a of an adjacent gate line pair 213. For example, the second distance has a range within about 1 to 5 micrometers to avoid an electrical short. A common electrode formed at the same layer and of the same material as the first and second gate lines 213a and 213b may also be formed between the pair of the first and second gate lines 213a and 213b.

In addition, the plurality of data lines 230 are formed along a second direction and over the first and second gate lines 213a and 213b with a gate insulating layer therebetween. Further, the data line 230 crosses the first and second gate lines 213a and 213b to define pixel regions "P1" and "P2". Namely, the data line 230 is disposed between the first and second pixel regions "P1" and "P2". In other words, when an area of the first and second pixel regions "P1" and "P2" are defined as a pixel areas "A1" and "A2", the data line 230 runs across the pixel areas "A1" and "A2". The TFT "Tr" in the first pixel region "P1" and the TFT "Tr" in the second pixel region "P2" are also connected to one data line 230. Namely, the first and second pixel regions "P1" and "P2" are driven by the one data line 230.

Also, the LCD device having the above structure may be referred to as a double rate drive (DRD) type LCD device. In the double rate drive type LCD device, a number of the data lines 230 is halved while a number of the gate lines 213a and 213b is doubled when compared to the related art LCD device. In addition, the auxiliary gate lines 232 are formed along the second direction on the first substrate 110. Namely, the auxiliary gate line 232 is parallel to the data line 230 and crosses the first and second gate lines 213a and 213b. The auxiliary gate lines 232 are alternately arranged with the data lines 230. Further, the auxiliary gate line 232 is disposed between first and second pixel areas "A1" and "A2".

In other words, each of the first and second pixel areas "A1" and "A2" is surrounded by the first and second gate lines 213a and 213b and two auxiliary gate lines 232, and the data line 230 runs across each of the first and second pixel areas "A1" and "A2". In addition, each of the first and second pixel regions "P1" and "P2" is surrounded by the first and second gate lines 213a and 213b, one auxiliary gate line 232 and one data line 230. The auxiliary gate line 232 is also formed of the same material and on the same layer as the data line 230.

Further, the auxiliary gate line 232 is connected to one of the first and second gate lines 213a and 213b through a first gate contact hole "CH1" in the gate insulating layer (see FIG. 5). One auxiliary gate line is connected to one gate line, another one auxiliary gate line is connected to another one gate line, and the other one auxiliary gate line is connected to the other one gate line.

For example, as shown in FIG. 5, when the reference numbers "gl1", "gl2", and "gl3" . . . are marked to the gate lines 213a and 213b in order and the reference numbers "dl1", "dl2", "dl3" . . . "agl1", "agl2", and "agl3" . . . are marked to the data lines 230 and the auxiliary gate lines 232 in order, the auxiliary gate lines "agl1", "agl2", and "agl3" are respectively connected to the gate lines "gl1", "gl2" and "gl3".

As discussed above, the LCD device generally has a horizontal length greater than a vertical length. For example, the wide TV has a resolution of 1080*720. Namely, 1080 dots in a horizontal direction and 720 dots in a vertical direction are arranged in a matrix shape. Because each dot includes three pixel regions along the horizontal direction, a number of the data lines 230 is 1080*3 and a number of the gate lines 213a and 213b is 720. The three pixel regions of each dot respectively have red, green and blue color filter patterns for producing full color images.

In the double rate driving type LCD device, a number of the gate lines 213a and 213b is doubled, and a number of the data lines 230 is halved. When the LCD device has a display region "DA" for a resolution of 1080*720, the data lines 230 of 1080*3/2 and the gate lines 213a and 213b of 720*2 are used. Because a number of the auxiliary gate lines 232 is the same as that of the data lines 230, the number of the auxiliary gate lines 232 are larger than that of the gate lines 213a and 213b. Accordingly, all gate lines 213a and 213b are electrically connected to the auxiliary gate lines 232 in a one-to-one correspondence.

In addition, a gate signal voltage is applied to the gate lines 213a and 213b through the auxiliary gate lines 232. Because the auxiliary gate line 232 is parallel to the data line 230, an end of the auxiliary gate line 232 and an end of the data line 230 are positioned in the non-display region "NA". A data pad electrode 257 and a gate pad electrode 253 are also formed in the non-display region "NA". Also, the data pad electrode 257 and the gate pad electrode 253 are respectively positioned in the data driving IC 171b and the gate driving IC 171a.

Further, the data pad electrode 257 is electrically connected to the data line 230 via a data link line 235, and the gate pad electrode 253 is electrically connected to the auxiliary gate line 232 via a gate link line 251. Accordingly, the driving circuit board 150 is positioned at one side of the first substrate 110, i.e., the non-display region "NA". There is no gate driving IC and gate driving circuit board at other sides of the first substrate, e.g., the second non-display region "NA2" of FIG. 1. Thus, a bezel of the LCD device can be narrowed. Also, in FIG. 2, there is only one non-display region "NA" at one side. Alternatively, there may be another non-display region at other sides, but the bezel of the LCD device is increased.

Thus, because a space for a driving IC, a driving circuit board, or electrical lines for applying a signal voltage to the gate lines is not required in another non-display region except the non-display region "NA", a width of the other non-display region is smaller than the display region "NA". Accordingly, a bezel of the LCD device can be narrowed.

Further, a TFT "Tr" connected to one of the first and second gate lines 213a and 213b and one of the data lines 230 is disposed in each of the first and second pixel regions "P1" and "P2". For example, the TFT "Tr" may include a gate electrode connected to one of the first and second gate lines 213a and 213b, a gate insulating layer, a semiconductor layer including an active layer of intrinsic amorphous silicon and an ohmic contact layer of impurity-doped amorphous silicon, a source electrode connected to the data line 230, and a drain electrode.

The TFTs "Tr" in the first and second pixel regions "P1" and "P2" of the first region "A1" are also connected to the first data line "dl1". In more detail, the TFT "Tr" in the first pixel region "P1" of the first region "A1" is connected to the first gate line "gl1", while the TFT "TR" in the second pixel region "P2" of the first region "A1" is connected to the second gate line "gl2". Similarly, the TFTs "Tr" in the first and second pixel regions "P1" and "P2" of the second region "A2" are connected to the second data line "dl2".

The TFT "Tr" in the first pixel region "P1" of the second region "A2" is also connected to the second gate line "gl2", while the TFT "TR" in the second pixel region "P2" of the second region "A2" is connected to the first gate line "gl1". Alternatively, the TFT "Tr" in the first pixel region "P1" of the second region "A2" may be connected to the first gate line "gl2", while the TFT "TR" in the second pixel region "P2" of the second region "A2" may be connected to the second gate line "gl1".

In addition, a pixel electrode 247 connected to the TFT "Tr" is disposed in each of the first and second pixel regions "P1" and "P2". When the common line is formed, the pixel electrode 247 overlaps the common line to form a storage capacitor. Alternatively, when the common line is not formed, the pixel electrode 247 overlaps one of the first and second gate lines 213a and 213b to form a storage capacitor.

Also, in FIG. 5, the pixel electrode 247 has a plate shape in each of the first and second pixel regions "P1" and "P2" on the first substrate 110, and the common electrode is formed on the second substrate 120. Alternatively, a plurality of pixel electrodes and a plurality of common electrodes, each of which has a bar shape, are alternately arranged with each other on the first substrate 110.

Figure 7:
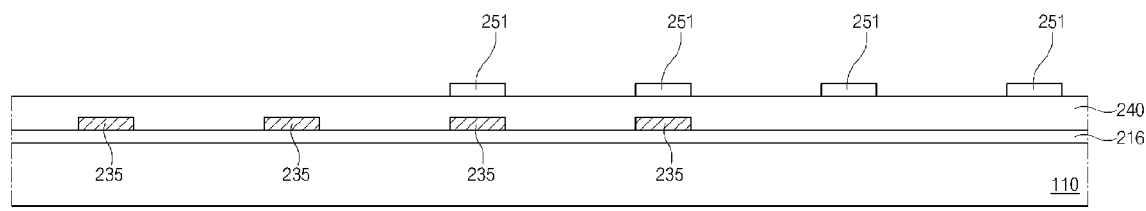
FIG. 7 is a cross-sectional view taken along the line VII-VII of FIG. 6.

Next, referring to FIG. 7, which is a cross-sectional view taken along the line VII-VII of FIG. 6, and with reference to FIGS. 2 and 6, the data link line 235 connected to the data line 230 is positioned in the non-display region "NA". Further, the data link line 235 is formed of the same material and disposed at the same layer as the data line 230. Namely, the data link line 135 is disposed on the gate insulating layer 216. The data pad electrode 257 is also formed at one end of the data link line 235. Namely, the data line 230 is electrically connected to the data pad electrode 257 via the data link line 235.

In addition, the auxiliary gate line 232 is disposed on the gate insulating layer 216. The auxiliary gate line 232 is formed of the same material and disposed at the same layer as the data line 230. A passivation layer 240 is formed on the data line 230, the auxiliary gate line 232 and the data link line 235. A second contact hole "CH2" exposing an end of the auxiliary gate line 232 and a data pad contact hole exposing the data pad electrode 257 are formed in the passivation layer 240 (see also FIG. 6).

Further, the gate link lines 251 are formed on the passivation layer 240. The gate link lines 251 are also respectively connected to the auxiliary gate lines 232 through the second contact holes "CH2". In addition, the gate pad electrodes 253 are formed at an end of each gate link line 251, and auxiliary data pad electrodes are formed on the passivation layer 240. The auxiliary data pad electrodes are respectively connected to the data pad electrodes 257 through the data pad contact holes.

In addition, the plurality of gate pad electrodes 253 are positioned in a first pad region "PA1" in the non-display region "NA", and the plurality of data pad electrodes 257 are positioned in a second pad region "PA2" in the non-display region NA". The first and second pad regions "PA1" and "PA2" are also alternately arranged with each other with a pre-determined space. It is also possible to alternately arrange the first and second pad regions "PA1" and PA2" because the data link line 235 and the gate link line 251 are formed at different layers.

In addition, FIGS. 5 and 6 show the data link line 235 on the same layer as the data line 230, and the gate link line 251 on a different layer from the auxiliary gate line 232. Alternatively, the data link line may be formed at a different layer from the data line, while the gate link line may be formed at the same layer as the auxiliary gate line. In this instance, the data link line is connected to the data line through a contact hole.

As mentioned above, the data lines 230 and the auxiliary gate lines 232 are disposed at the same layer and alternately arranged with each other. Accordingly, when the data pad electrodes and the gate pad electrodes are respectively formed at an end of the data link lines and the gate link lines with the same layer as the data link line and the gate link line, the data pad electrodes and the gate pad electrodes are preferably alternately arranged with each other to avoid an electrical short between the data link lines and the gate link lines. In this instance, both the data pad electrode and the gate pad electrode are formed in each of the FPCBs 161 and 162. Accordingly, it is difficult to provide signals, and there is an electrical interference problem.

However, because the data link lines 235 and the gate link lines 251 are formed at different layers, the gate pad electrodes 253 without the data pad electrodes 257 are formed in the first FPCB 161 in the first pad region "PA2" and the data pad electrodes 257 without the gate pad electrodes 253 are formed in the second FPCB 162 in the second pad region "PA2".

In addition, the driving circuit board 150 is attached to the non-display region "NA" with the first and second FPCBs 161 and 162 and contacts the first and second FPCBs 161 and 162. FIG. 2 shows two driving circuit boards 150. Alternately, there may be one driving circuit board. Also, the second substrate 120 is attached with the first substrate 110 with the liquid crystal layer therebetween such that the LCD device 101 is obtained.

Further, a black matrix corresponding to boundaries of the first and second pixel regions "P1" and "P2" is formed on the second substrate 120, and red, green and blue color filters corresponding to the first and second pixel regions "P1" and "P2" are formed on the second substrate 120. In addition, the common electrode is formed on a substantially entire surface of the second substrate 120. As mentioned above, the common electrode may be formed on the first substrate 110 with the pixel electrode.

Also, the second substrate 120 covers the display region "DA" and exposes the non-display region "NA". Namely, the second substrate 120 has a smaller size than the first substrate 110. The other sides of the first and second substrates 110 and 120 except the non-display region "NA" have the same end position.

Thus, in embodiments of the present invention, both the data pad electrodes 257 and the gate pad electrodes 253 are formed in one non-display region "NA" at one side of the first substrate 110, and the driving circuit board 150 is attached to the non-display region "NA" with the first and second FPCB 161 and 162. Namely, other non-display regions at other sides of the first substrate 110 are not required such that a bezel of the LCD device 101 is narrowed.

In addition, because the auxiliary gate line 232 is spaced apart from the data line 230 with a space of one of the first and second pixel regions "P1" and "P2", there is no electrical interference. Furthermore, because a number of the data lines 230 is decreased, an aperture ratio is increased.

In addition, the present embodiments can be applied to flexible displays. For example, an LCD can be formed to be flexible and thus these type of displays are referred to as flexible displays. A flexible display can be used in a watch, for example, that bends around the user's wrist. A flexible display can also be used in advertisements. According to an embodiment of the present invention, the flexible display can be formed to have a cylinder or other shape. Further, because the data and gate driving ICs are formed on one side of the flexile LCD, the flexible LCD can be effectively bonded together at sides of the flexible LCD not including the data and gate driving ICs.

Thus, the embodiments of the present invention allow for increasing a display region and decreasing a non-display region in a display device.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An array substrate for a liquid crystal display device, the array substrate comprising:
   a substrate including a display region and a non-display region at one side of the display region;
   gate lines along a first direction and in the display region;
   data lines along a second direction and in the display region, the data lines crossing the gate lines to define pixel regions;
   auxiliary gate lines along the second direction and in the display region, the auxiliary gate lines respectively connected to the gate lines;
   data pad electrodes in the non-display region and electrically connected to the data lines, respectively;
   gate pad electrodes in the non-display region and electrically connected to the auxiliary gate lines, respectively;
   a first display region including first and second pixels and a second display region including third and fourth pixels in a first row of the display region; and a third display region including fifth and sixth pixels and a fourth display region including seventh and eighth pixels in a second row of the display region, wherein a first data line is disposed between the first and second pixels and between the fifth and sixth pixels, said first data line being configured to drive both of the first and second pixels and to drive both of the fifth and sixth pixels, wherein a second data line is disposed between the third and fourth pixels and between the seventh and eight pixels, said second data line being configured to drive both of the third and fourth pixels and to drive both of the seventh and eight pixels, and wherein a corresponding auxiliary gate line is disposed between the first and second display regions and between the third and fourth display regions and is connected to gate lines disposed between the first and second rows.

2. The array substrate of claim 1, wherein the data and gate pad electrodes are included in the non-display region on a same side of the display region.

3. The array substrate of claim 1, wherein the data lines are alternately arranged with the auxiliary gate lines.

4. The array substrate of claim 1, wherein the auxiliary gate lines are formed at the same layer as the data lines.

5. The array substrate of claim 1, wherein the auxiliary gate lines are disposed over the gate lines with a gate insulating between the auxiliary gate lines and the gate lines, and the auxiliary gate lines are respectively connected to the gate lines through a contact hole in the gate insulating layer.

6. The array substrate of claim 1, further comprising:
first and second flexible printed circuit boards in the non-display region, wherein the data pad electrodes are positioned in the first flexible printed circuit board, and the gate pad electrodes are positioned in the second flexible printed circuit board; and
a driving circuit board attached to the non-display region via the first and second flexible printed circuit boards.

7. The array substrate of claim 1, further comprising:
data link lines in the non-display region and connecting the data lines to the data pad electrodes;
gate link lines in the non-display region and connecting the auxiliary gate lines to the first and second gate pad electrodes; and
a passivation layer on the data lines, the auxiliary gate lines, and the data link lines and under the gate link lines,
wherein the data link lines are formed on the same layer as the data lines, and the gate link lines respectively contact the auxiliary gate lines through a contact hole in the passivation layer.

8. The array substrate of claim 7, further comprising:
a first thin film transistor and a first pixel electrode in a first pixel region and a second thin film transistor and a second pixel electrode in a second pixel region,
wherein the first thin film transistor is connected to a first gate line and a first data line, and the second thin film transistor is connected to the first gate line and a second data line, and
wherein the first and second pixel electrodes are respectively connected to the first and second thin film transistors.

9. The array substrate of claim 1, wherein a distance between pixels included in the first and second display regions is smaller than a distance between the pixels in the first display region and the pixels in the second display region.

10. The array substrate of claim 1, wherein the auxiliary gate lines are disposed over the gate lines with a gate insulating between the auxiliary gate lines and the gate lines, and the auxiliary gate lines are respectively connected to the gate lines through a contact hole in the gate insulating layer.

11. The array substrate of claim 1, further comprising:
first and second flexible printed circuit boards in the non-display region, wherein the data pad electrodes are positioned in the first flexible printed circuit board, and the gate pad electrodes are positioned in the second flexible printed circuit board; and
a driving circuit board attached to the non-display region via the first and second flexible printed circuit boards.

12. The array substrate of claim 1, further comprising:
data link lines in the non-display region and connecting the data lines to the data pad electrodes;
gate link lines in the non-display region and connecting the auxiliary gate lines to the gate pad electrodes; and
a passivation layer on the data lines, the auxiliary gate lines, and the data link lines and under the gate link lines,
wherein the data link lines are formed on the same layer as the data lines, and the gate link lines respectively contact the auxiliary gate lines through a contact hole in the passivation layer.

13. The array substrate of claim 1, further comprising:
a first thin film transistor and a first pixel electrode in a first pixel region and a second thin film transistor and a second pixel electrode in a second pixel region,
wherein the first thin film transistor is connected to a first gate line and a first data line, and the second thin film transistor is connected to the first gate line and a second data line, and
wherein the first and second pixel electrodes are respectively connected to the first and second thin film transistors.

14. A liquid crystal display device, comprising:
a substrate including a display region and a non-display region at one side of the display region;
gate lines along a first direction and in the display region;
data lines along a second direction and in the display region, the data lines crossing the gate lines to define pixel regions;
auxiliary gate lines along the second direction and in the display region, the auxiliary gate lines respectively connected to the gate lines;
data pad electrodes in the non-display region and electrically connected to the data lines, respectively;
gate pad electrodes in the non-display region and electrically connected to the auxiliary gate lines, respectively;
a second substrate facing the first substrate;
a liquid crystal layer between the first and second substrates;
a first display region including first and second pixels and a second display region including third and fourth pixels in a first row of the display region; and
a third display region including fifth and sixth pixels and a fourth display region including seventh and eighth pixels in a second row of the display region,
wherein a first data line is disposed between the first and second pixels and between the fifth and sixth pixels, said first data line being configured to drive both of the first and second pixels and to drive both of the fifth and sixth pixels,
wherein a second data line is disposed between the third and fourth pixels and between the seventh and eight pixels, said second data line being configured to drive both of the third and fourth pixels and to drive both of the seventh and eight pixels, and wherein a corresponding auxiliary gate line is disposed between the first and second display regions and between the third and fourth display regions and is connected to gate lines disposed between the first and second rows.

15. The liquid crystal display device of claim 14, wherein the data and gate pad electrodes are included in the non-display region on a same side of the display region.

16. The liquid crystal display device of claim 14, wherein the data lines are alternately arranged with the auxiliary gate lines.

17. The liquid crystal display device of claim 14, wherein the auxiliary gate lines are formed at the same layer as the data lines.

18. The liquid crystal display device of claim 14, wherein the auxiliary gate lines are disposed over the gate lines with a gate insulating between the auxiliary gate lines and the gate lines, and the auxiliary gate lines are respectively connected to the gate lines through a contact hole in the gate insulating layer.

19. The liquid crystal display device of claim 14, further comprising:
   first and second flexible printed circuit boards in the non-display region, wherein the data pad electrodes are positioned in the first flexible printed circuit board, and the gate pad electrodes are positioned in the second flexible printed circuit board; and
   a driving circuit board attached to the non-display region via the first and second flexible printed circuit boards.

20. The liquid crystal display device of claim 14, further comprising:
   data link lines in the non-display region and connecting the data lines to the data pad electrodes;
   gate link lines in the non-display region and connecting the auxiliary gate lines to the first and second gate pad electrodes; and
   a passivation layer on the data lines, the auxiliary gate lines, and the data link lines and under the gate link lines,
   wherein the data link lines are formed on the same layer as the data lines, and the gate link lines respectively contact the auxiliary gate lines through a contact hole in the passivation layer.

21. The liquid crystal display device of claim 20, further comprising:
   a first thin film transistor and a first pixel electrode in a first pixel region and a second thin film transistor and a second pixel electrode in a second pixel region,
   wherein the first thin film transistor is connected to a first gate line and a first data line, and the second thin film transistor is connected to the first gate line and a second data line, and
   wherein the first and second pixel electrodes are respectively connected to the first and second thin film transistors.

22. The liquid crystal display device of claim 14, wherein a distance between pixels included in the first and second display regions is smaller than a distance between the pixels in the first display region and the pixels in the second display region.

23. The liquid crystal display device of claim 14, wherein the auxiliary gate lines are disposed over the gate lines with a gate insulating between the auxiliary gate lines and the gate lines, and the auxiliary gate lines are respectively connected to the gate lines through a contact hole in the gate insulating layer.

24. The liquid crystal display device of claim 14, further comprising:
   first and second flexible printed circuit boards in the non-display region, wherein the data pad electrodes are positioned in the first flexible printed circuit board, and the gate pad electrodes are positioned in the second flexible printed circuit board; and
   a driving circuit board attached to the non-display region via the first and second flexible printed circuit boards.

25. The liquid crystal display device of claim 14, further comprising:
   data link lines in the non-display region and connecting the data lines to the data pad electrodes;
   gate link lines in the non-display region and connecting the auxiliary gate lines to the gate pad electrodes; and
   a passivation layer on the data lines, the auxiliary gate lines, and the data link lines and under the gate link lines,
   wherein the data link lines are formed on the same layer as the data lines, and the gate link lines respectively contact the auxiliary gate lines through a contact hole in the passivation layer.

26. The liquid crystal display device of claim 14, further comprising:
   a first thin film transistor and a first pixel electrode in a first pixel region and a second thin film transistor and a second pixel electrode in a second pixel region,
   wherein the first thin film transistor is connected to a first gate line and a first data line, and the second thin film transistor is connected to the first gate line and a second data line, and
   wherein the first and second pixel electrodes are respectively connected to the first and second thin film transistors.

27. An array substrate for a liquid crystal display device, the array substrate comprising:
   a first display region including first and second pixels and a second display region including third and fourth pixels in a first row of the display region;
   a third display region including fifth and sixth pixels and a fourth display region including seventh and eighth pixels in a second row of the display region,
   wherein a first data line is disposed between the first and second pixels and between the fifth and sixth pixels, said first data line being configured to drive both of the first and second pixels and to drive both of the fifth and sixth pixels,
   wherein a second data line is disposed between the third and fourth pixels and between the seventh and eight pixels, said second data line being configured to drive both of the third and fourth pixels and to drive both of the seventh and eight pixels, and
   wherein the first and second pixels are spaced from each other by a first distance and the third pixel is spaced from the second pixel by a second distance that is greater than the first distance;
   gate lines along a first direction of the array substrate;
   data lines along a second direction of the array substrate, the data lines crossing the gate lines and being between the first and second pixels;
   auxiliary gate lines along the second direction and being between the second and third pixels in the display region, the auxiliary gate lines respectively connected to the gate lines; and
   a non-display region including data pad electrodes electrically connected to the data lines and gate pad electrodes electrically connected to the auxiliary gate lines,
   wherein a corresponding auxiliary gate line is disposed between the first and second display regions and between the third and fourth display regions and is connected to gate lines disposed between the first and second rows.

\* \* \* \* \*